Aug. 16, 1932.    W. SCHAAKE ET AL    1,872,351
THIRD-RAIL SHOE
Filed March 20, 1930    2 Sheets-Sheet 1
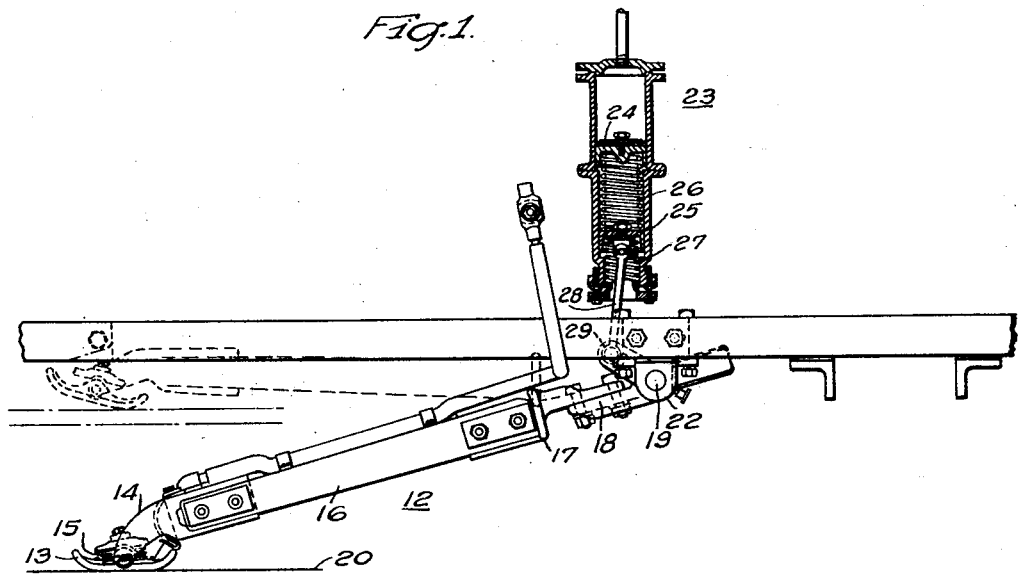
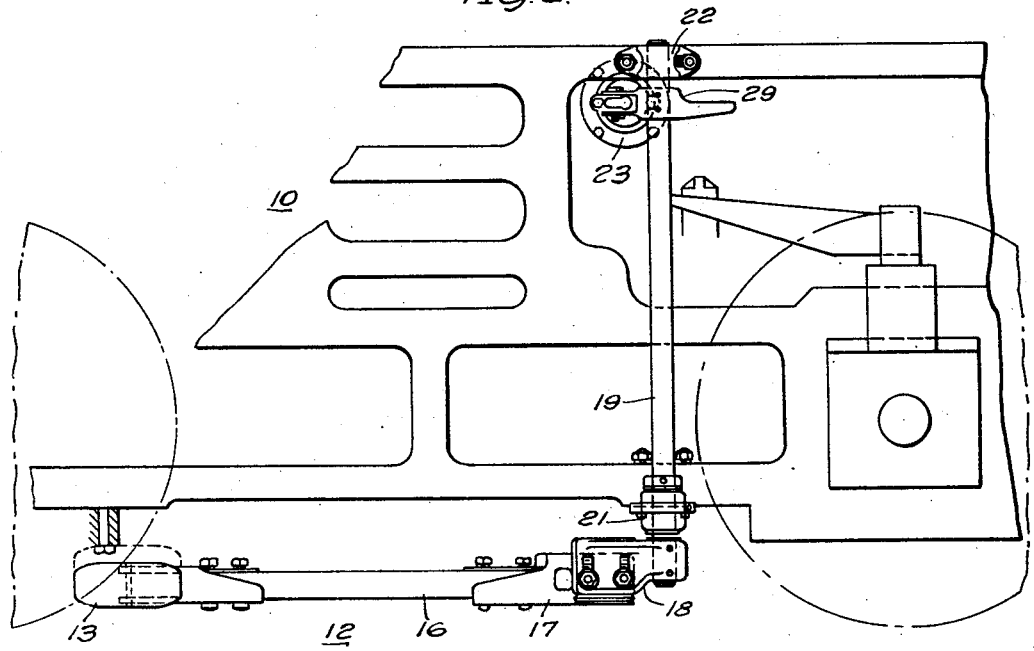
INVENTORS.
William Schaake
and David E. Renshaw.
BY
ATTORNEY

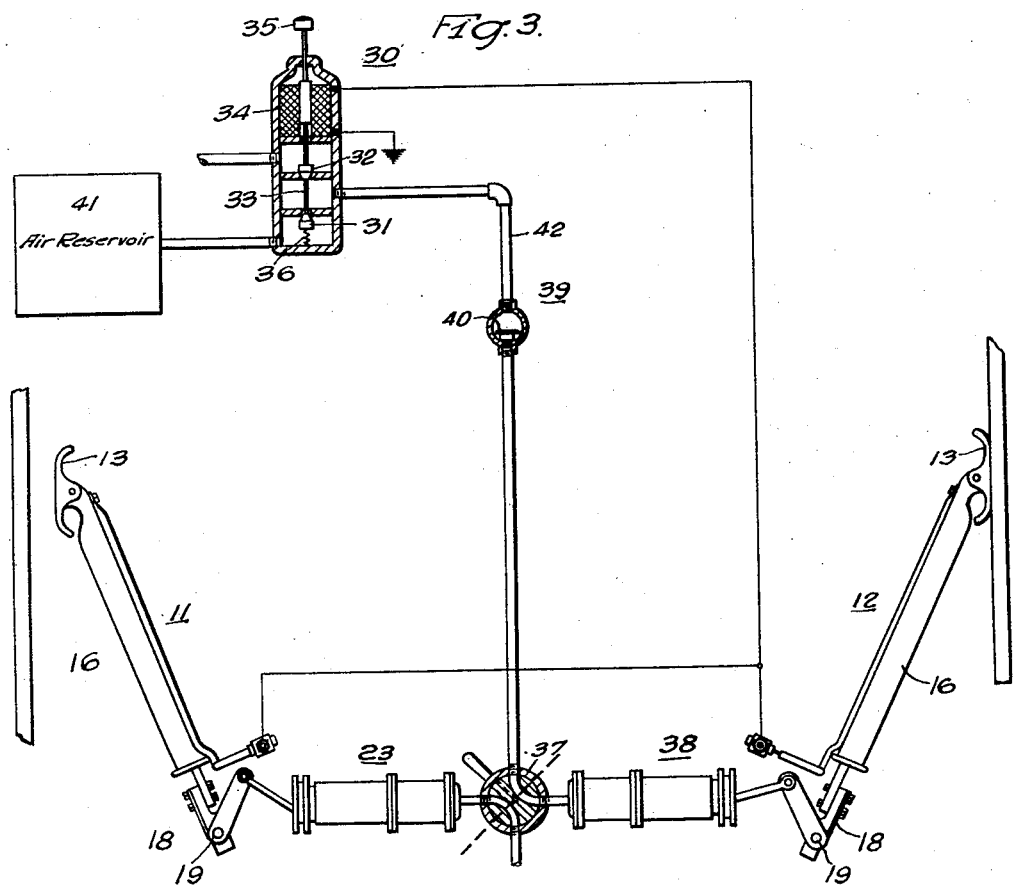

Patented Aug. 16, 1932

1,872,351

UNITED STATES PATENT OFFICE

WILLIAM SCHAAKE, OF PITTSBURGH, AND DAVID E. RENSHAW, OF FOREST HILLS, PENNSYLVANIA, ASSIGNORS TO WESTINGHOUSE ELECTRIC AND MANUFACTURING COMPANY, A CORPORATION OF PENNSYLVANIA

THIRD-RAIL SHOE

Application filed March 20, 1930. Serial No. 437,480.

Our invention relates to electric vehicles and particularly to current collectors carried by the vehicles for collecting current from the supply conductors.

The object of our invention, generally stated, is to provide a current collector that shall be simple and efficient in operation and which may be readily and economically manufactured and installed.

A more specific object of our invention is to provide for collecting current for operating electric vehicles from a supply conductor mounted at the side of the vehicle and parallel to the roadway.

Another object of our invention is the provision of a current collector which may be pneumatically advanced to the operative position and may be automatically retrieved from the operative position, when the collector is disengaged from the supply conductor or when the supply conductor is deenergized.

Other objects of our invention will become evident from the following detailed description, taken in conjunction with the accompanying drawings, in which:

Figure 1 is a top plan view showing details of the current collector and the operating mechanism;

Fig. 2 is a view, in side elevation, of the apparatus shown in Fig. 1;

Fig. 3 is a diagrammatic view of a system of control organized in accordance with our invention.

Referring to the drawings, a portion of an electric vehicle 10 of any well known type is shown equipped with two current collectors 11 and 12, as indicated in Fig. 3. A current collector is mounted on each side of the vehicle and, as shown in Fig. 1, is disposed to engage a supply conductor. In this instance, the conductor is located at the side of the vehicle and extends parallel to the roadway. For simplicity, the details of only one current collector and one operating mechanism have been shown in Figs. 1 and 2. The equipment required for the other side of the vehicle is a duplicate of that shown in Figs. 1 and 2.

In order that the shoe 13 shall not be affected by slight irregularities in the third rail, it is pivotally mounted on a pole head 14 and, as shown in Fig. 1, a spring 15 is interposed between the shoe 13 and the head 14. The pole head is mounted on the end of a pole 16, which is supported by a bracket 17. The bracket 17 is attached to an arm 18 which is attached to the lower end of a perpendicular shaft 19.

In order that the height of the shoe may be adjusted to compensate for wearing of the locomotive wheels, the faces of the bracket 17 and the arm 18 are serrated, as shown in Fig. 2. If the locomotive wheels wear, the bracket may be adjusted by means of slots in the arm and cooperating bolts, thereby maintaining the center line of the shoe in alignment with the center line of the third rail.

As indicated in Fig. 1, the current collector may be actuated in a horizontal plane in order to engage a third rail 20. In this particular instance, since there is no room at the bottom of the locomotive frame for mounting the operating mechanism, this mechanism is mounted at the top of the frame, and the perpendicular shaft 19 is provided to connect the operating mechanism to the current collector. This shaft is supported at the bottom by a thrust bearing 21 and at the top by a sleeve bearing 22.

The current collector is actuated by an air cylinder 23 of a well known type. This cylinder comprises a main piston 24 which is operated by air pressure and an auxiliary piston 25 operated by springs 26 and 27. A piston rod 28 connects the auxiliary piston 25 to an arm 29 which is fastened to the perpendicular shaft 19. When air is admitted to the cylinder 23, the springs 26 and 27 are compressed, and the current collector 12 is advanced to the operative position. As shown in Fig. 1, the auxiliary piston 25 is resiliently interposed between the two springs 26 and 27. When air is released from the cylinder 23 or 38, pressure is removed from the spring 26, and the action of the spring 27 will retrieve the current collector from the operative position to the inoperative position, as indicated by the broken lines in Fig. 1.

The admission of air to the operating cylinders is controlled by an air magnet valve 30, shown in Fig. 3. This valve comprises an inlet valve 31 and an exhaust valve 32 supported by a shaft 33 which may be actuated by a magnet 34 or by a push button 35. When the coil of the magnet 34 is energized, the inlet valve 31 is opened and the exhaust valve 32 is closed. When the magnet is deenergized, a spring 36 will close the inlet valve and open the exhaust valve.

In order that only one of the shoes may be advanced to the conductor-engaging position at the same time, a four-way valve 37 is interposed between the air magnet valve 30 and the operating cylinders 23 and 38. As shown in Fig. 3, when the four-way valve 37 is in one position, air will be admitted to the right-hand air cylinder 38 and will be exhausted from the left-hand cylinder 23. When the valve 37 is actuated to the position indicated by the broken lines, air will be admitted to the left-hand cylinder and exhausted from the right-hand cylinder.

In order to govern the rate at which the current collectors shall be advanced and retrieved, a check valve 39 is interposed in the air line, as shown in Fig. 3. A small hole is drilled in a swinging part 40, which is pivoted at one side. When the swinging part 40 is closed, as shown in Fig. 3, air flowing from the air reservoir 41 must pass through this small opening. This will retard the flow of air and cause the shoe to be advanced slowly into contact with the third rail, thereby avoiding breakage of the shoe or its supporting arm. When the air magnet valve 30 has been actuated to the exhaust position, air flowing from the air cylinders will raise the swinging part 40 of the check valve 39 and will be permitted to exhaust rapidly. This will allow the current collector to be rapidly retrieved from the operative position.

On electric-railway systems utilizing side-contact third rails as supply conductors, it is customary to equip the locomotives with two or more current collectors, one being mounted on each side of the locomotive. One section of the system may have the supply conductor mounted at one side of the track, while, in another section, the supply conductor may be on the other side, which requires a current collector on each side of the locomotive. Also, in single-track systems, the locomotive must be provided with a current collector on each side in order that it may operate in opposite directions.

When one of the current collectors is moved beyond the end of the supply conductor, or its engagement is no longer desired, it is necessary that it be withdrawn from its operative position in order that it shall not come into contact with projections or objects positioned along the roadway.

This result is accomplished by utilizing the foregoing described apparatus, the operation of which may be set forth as follows:

In order to advance the right-hand collector 12 to its operative position, it is necessary to set the four-way valve 37 in the position shown in Fig. 3. By pressing the hand-push button 35 of the air-magnet valve 30 the inlet valve 31 will be opened. Air will be permitted to flow from the air reservoir 41, through the inlet valve 31, the conducting pipe 42, the check valve 39 and the four-way valve 37, to the air cylinder 38. The pressure of the air against the piston of this cylinder will actuate the shoe 13 into engagement with the third rail. After the shoe has made contact with the third rail, the hand push button 35 of the air magnet valve 30 may be released. The core of the magnet valve will be retained in the position shown in Fig. 3, as long as the coil is energized. If the shoe becomes disengaged from the third rail or this rail becomes deenergized, the coil of the air magnet valve will be deenergized, and the exhaust valve 32 will be opened. This will relieve the air pressure on the air cylinder 38, and the current collector 12 will be automatically retrieved from its operative position by the spring 27.

In order to advance the left-hand collector 11 to the operative position, it is necessary to set the four-way valve 37 in the position indicated by the broken lines and again press the hand-push button 35 of the air-magnet valve 30. The collector 11 will then be retained in the operative position until the shoe is disengaged from the third rail or until the third rail is deenergized, when the collector will be automatically retrieved.

Either of the current collectors may be retrieved from its operative position at the desire of the operator by setting the four-way valve 37 in the opposite position, that is, if it is desired to retrieve the right-hand collector 12, this can be done by setting the four-way valve in the position indicated by the broken lines which will permit the air to be exhausted from the right-hand air cylinder 38.

From the foregoing description, it may be seen that either current collector can be actuated to the operative position or retrieved from the operative position at the desire of the operator, also that the collectors will be automatically retrieved from the operative position in case the shoe of the current collector is disengaged from the supply conductor or in case the supply conductor becomes deenergized.

We do not desire to be restricted to the specific embodiment of our invention herein shown and described since it is evident that it may be changed and modified without departing from the spirit and scope of our invention as defined in the appended claims.
We claim as our invention:

1. In a vehicle current-collector for engaging conductors, in combination, a plurality of shoes for engaging conductors, arms for carrying the shoes, pneumatically actuated means for advancing the shoes to the conductor-engaging position, resilient means for retrieving the shoes from the conductor-engaging position, means for selecting the shoe to be operated, manually actuated means for controlling the admission of fluid under pressure to said pneumatically actuated means, electro-magnetic means responsive to the energization of the current collector for controlling the exhaustion of the fluid from said pneumatically actuated means, and means for controlling the rate of flow of the fluid.

2. In a vehicle current-collector for engaging conductors, in combination, a shoe for engaging a conductor, an arm for carrying the shoe, pneumatically actuated means for advancing the shoe to the conductor-engaging position, resilient means for retrieving the shoe from the conductor-engaging position, manually operated means for controlling the admission of compressed fluid to said pneumatically actuated means, electrically operated means for controlling the exhaustion of the pressure fluid from said pneumatically actuated means, and means for governing the rate of admission and exhaustion of the pressure fluid.

3. In a vehicle current-collector for engaging conductors, in combination, a shoe for engaging a conductor, an arm for carrying the shoe, pneumatically actuated means for advancing the shoe to the conductor-engaging position, electro-magnetic means for controlling the operation of said pneumatically actuated means, resilient means for retrieving the shoe from the conductor-engaging position, and means for governing the rate of advancement and retrievement of said collector.

4. In a vehicle current-collector, in combination, a shoe for engaging a conductor, an arm for carrying the shoe, said shoe being disposed for movement in a horizontal plane to engage a supply conductor, means for adjusting the height of the shoe to aline with the supply conductor, pneumatically actuated means for advancing the shoe into engagement with the supply conductor, resilient means for retrieving the shoe from engagement with the supply conductor, and means for transmitting the force exerted by the actuating means to the shoe, thereby permitting the actuating means to be mounted remotely from the shoe.

5. In a vehicle current-collector for engaging conductors, in combination, a shoe for engaging a conductor, a pivotally-mounted arm for carrying the shoe, pneumatically-actuated means for advancing the shoe to, and retaining it in, a conductor-engaging position to collect current, means for governing the rate of advancement of the shoe, and electromagnetic means responsive to the energization of the shoe for automatically governing the position of said shoe.

6. In a vehicle current-collector for engaging conductors, in combination, current-collecting means for engaging a conductor, a pivotally-mounted arm for carrying the current-collecting means, a piston disposed to actuate said arm, means for applying fluid pressure to the piston to advance the collecting means to, and retain it in, a conductor-engaging position to collect current, means for governing the rate of advancement of the current-collecting means, spring means for retrieving the shoe from the conductor-engaging position when the flow of current is interrupted, and electro-magnetic means responsive to the energization of the current-collecting means for controlling the application of fluid pressure to said piston to govern the position of the current-collecting means.

In testimony whereof, we have hereunto subscribed our names this 12th day of March, 1930.

WILLIAM SCHAAKE.
DAVID E. RENSHAW.